Aug. 14, 1962   J. W. HORNER   3,048,969
IMPULSE ROCKET FOR ATTITUDE CONTROL
Filed Sept. 8, 1958   2 Sheets-Sheet 1
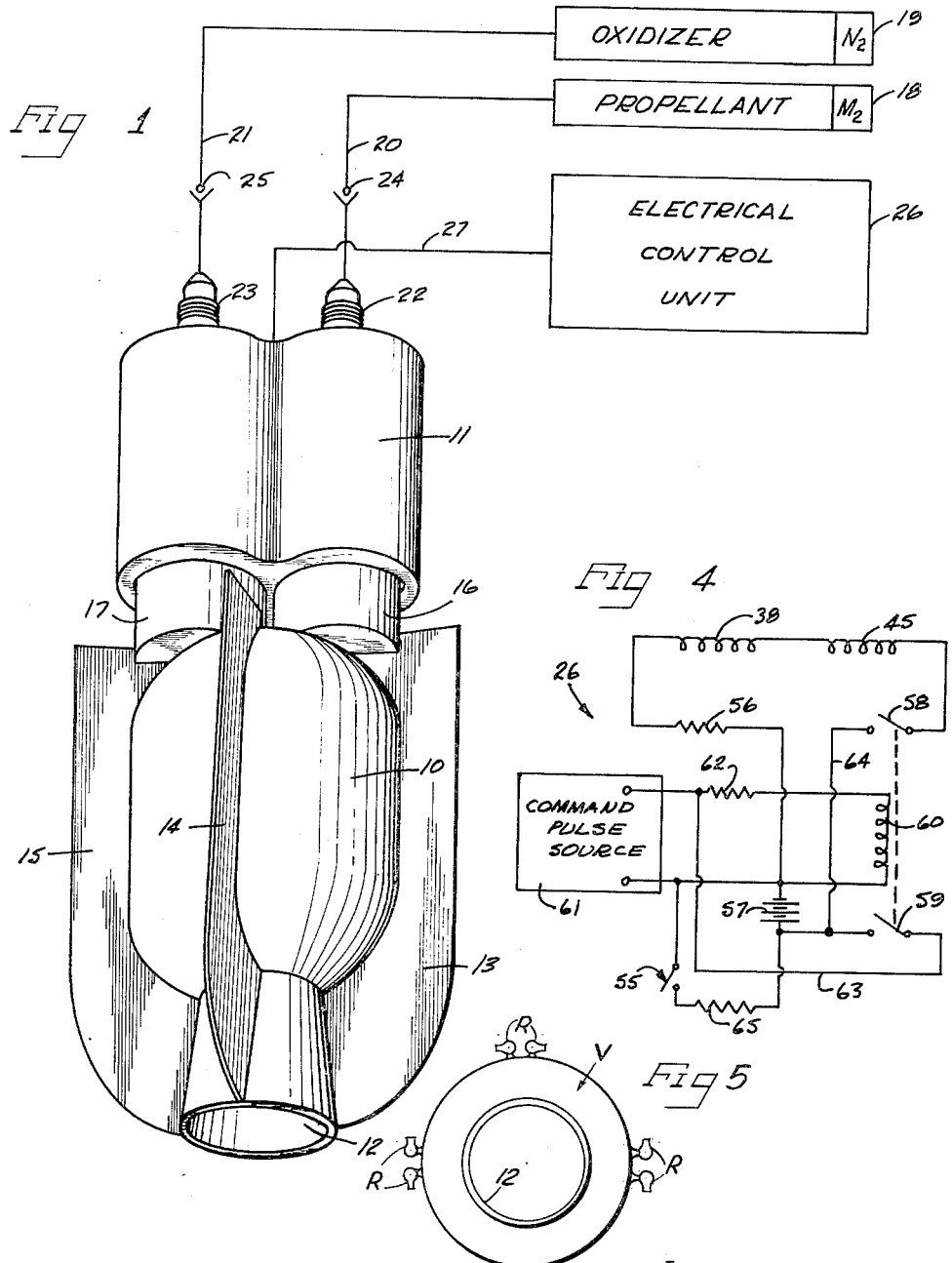
Inventor
JOHN W. HORNER
by Hill, Sherman, Meroni, Gross & Simpson Attys Aug. 14, 1962
J. W. HORNER
3,048,969
IMPULSE ROCKET FOR ATTITUDE CONTROL
Filed Sept. 8, 1958
2 Sheets-Sheet 2
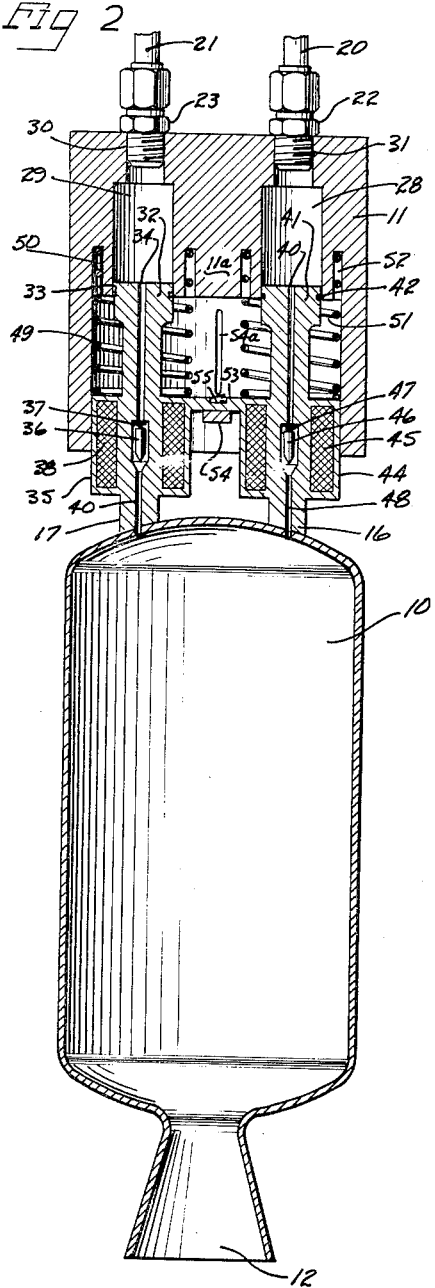
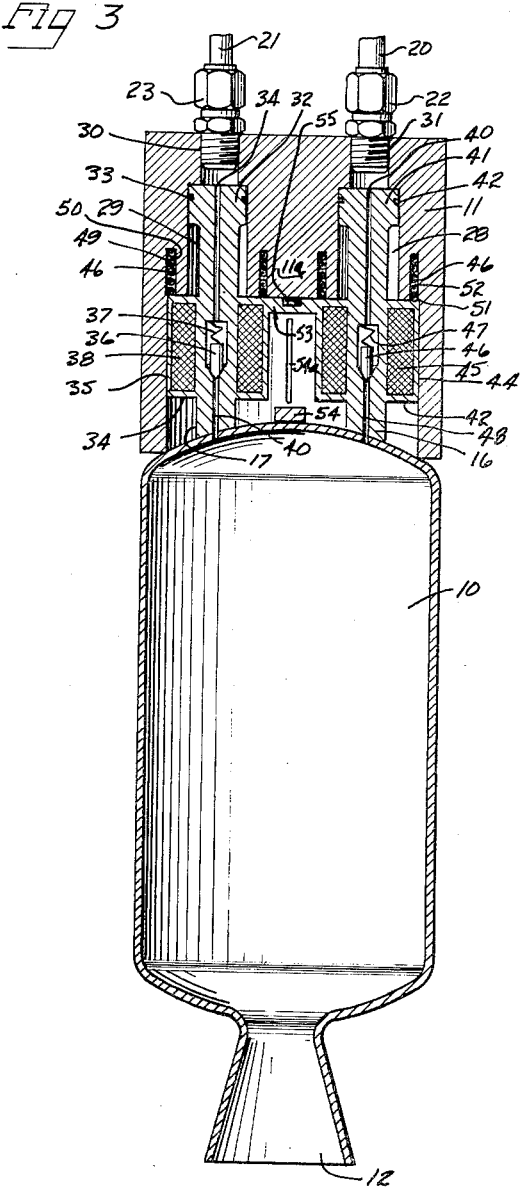
Inventor
JOHN W. HORNER

United States Patent Office 3,048,969
Patented Aug. 14, 1962

3,048,969
IMPULSE ROCKET FOR ATTITUDE CONTROL
John W. Horner, Whittier, Calif., assignor to Thompson Ramo Wooldridge Inc., Cleveland, Ohio, a corporation of Ohio
Filed Sept. 8, 1958, Ser. No. 759,519
5 Claims. (Cl. 60—35.6)

This invention relates to an impulse rocket for attitude control systems of orbiting vehicles, satellites, missiles, aircraft, space craft, and the like. More generally, the present invention relates to apparatus for producing and delivering a minute, accurate, measured quantum of impulse or thrust per predetermined time interval on receipt of a single command signal and in cyclic and repetitive fashion if desired. The apparatus is adapted to produce a quantized or digitized predetermined amount of impulse for each command signal or pulse received and is particularly adapted for use in the control and orientation of any vehicle which operates in a force free field such as orbiting space vehicles or satellites or other vehicles for the movement of men and equipment in a force free field. It will, however, be understood that the apparatus may be used in conjunction with any type of aircraft or in any application where it is desired to produce thrust or impulse controllably in a quantized or digitized fashion.

In attempting to apply conventional rocket motors to attitude control systems for space vehicles, one encounters the fact that rockets all must have a minimum pressure for steady state operation, that is, they have a threshold pressure. When they are turned on and off in the conventional manner, they incur transient tolerances which cannot be duplicated, since the quantity of fuel permitted to flow to the rocket cannot be exactly measured. Naturally, these tolerances are all reflected in the movement of the vehicle and must be corrected out by the expenditure of excessive propellant only after undesired vehicle perturbations have resulted. Consequently, other methods of achieving attitude control for space vehicles have been considered. Such methods include the use of cold gas contained in high pressure tanks which is ejected through reaction nozzles as needed and the use of hot gas generated in a central source by chemicals and likewise ejected through reaction nozzles as needed. Each of these methods, however, requires apparatus which is heavy, bulky, and definitely limited in duration of application. For example, such cold or hot gas systems may be used for a vehicle with a 24 hour life expectancy, but are not suitable to vehicles having a life expectancy of a week or a month.

The present state of the art of liquid rocket engines also exhibits marked deficiencies when considered from the standpoint of efficiency and reliability in control applications. The degree of dependability of a propulsion system is in general a function of several factors including the power controls which encompass propellant ignition, regulation during the thrust increase to the rated thrust, conditions controlling malfunction probability during starting transient, some form of thrust control, and fuel-oxidizer mixture ratio or propellant utilization control. From an examination of the above factors from the point of view of individual subassemblies involved, the existing deficiencies within the art will be more apparent.

Whatever the fuel feed means, there is required downstream from the fuel and oxidizer tanks and the particular propellant feed means used, a precise and necessary complicated synchronization device which must be considered an integral part of the ignition design.

A rigidly timed sequence of physical operations is essential to avoid dangerous propellant accumulation in the thrust chamber coincident with possible dilatory auto-ignition. Devices employed currently are susceptible to failure, often with hazardous results.

Once the rocket engine has been started, there arises in certain missile applications requirements for accurate thrust level control or accurate thrust cut-off reproducibility due to the adopted guidance systems. There are two relatively convenient ways to vary the thrust magnitude. The first of these is by reducing the pressure of combustion in the rocket chamber. However, this also reduces efficiency and is not a truly attractive method. The second method is adjustment of the throat area of the thrust chamber. Thermodynamically this is a more efficient means than the preceding but often results in mechanical difficulties. It should be noted that while both of these arrangements are workable, they do impose compromises. Therefore, these attempts toward impulse variation do not enjoy a general acceptance. In practice, impulse adjustment when desired is more often accomplished by adding and subtracting chambers or by controlling time of shut off rather than by throttling.

It is accordingly a primary aim of the present invention to provide a system which produces a reaction force for use in propulsion or orientation of missiles, pilotless aircraft and the like which system has inherent reliability by virtue of minimization of operating elements, and by virtue of the fact that each of the components used has been developed to its highest state of individual reliability.

Another object of the invention is to provide an improved rocket engine characterized by relatively light weight, small size, reusability, and suitability for varied sizes and classes of vehicles.

Another object of the present invention is to provide a rocket motor of simple and reproducible construction wherein the starting mechanism and propellant feed means are integrated to the reaction chamber so as to eliminate superfluous plumbing, synchronization devices and fuel-oxidizer mixture ratio or propellant utilization controls while at the same time rendering unnecessary the conventional high level pressurization with attendant excessive storage tank weight or pumping devices to provide desired propellant flows.

A further object of this invention is to provide a liquid bipropellant rocket motor capable of critical impulse variations without concession to maximum specific impulse.

A still further object of this invention is to provide a propulsion system having a propellant feeding means which functions only upon assured ignition and sustained combustion of propellant elements so as to eliminate malfunction hazards during the starting transient.

It is a further object of this invention to provide an impulse rocket which is light in weight, simple in operation, and which offers the highest available specific impulse by generating on demand high temperature gas at maximum efficiency.

It is a further object of this invention to provide an impulse rocket which does not require rotary pumps, high pressure stored gas bottles, or special starting apparatus, and in which the number of parts is minimized and various parts perform a multiplicity of functions.

Briefly, in accordance with one aspect of the invention, each of two necessary ingredients for a bipropellant rocket flows from its respective low pressure storage tank into an associated injector cylinder which is thereby filled. When propellant valves for each of these cylinders are opened in response to a command pulse or signal, the ingredients flow into a reaction chamber and hypergolically react. Gases which are expelled through a conventional rocket nozzle produce the desired control force for the parent vehicle and at the same time push axially bored propellant injector pistons upwardly in the cylinders thus forcing all of the propellant in the injector cylinders through the bore and into the reaction chamber. When all propellant is exhausted from the injector cylinders, the thrust decays at the end of the impulse cycle and a stop member limiting the travel of the injector pistons trips a limit switch which closes the propellant valves and the pistons are spring returned so that the cylinders may be refilled in readiness for operation in response to the next command.

Other features, objects and advantages of the present invention will be more fully apparent from the following detailed description taken in connection with the accompanying drawings in which like reference characters are used to refer to like parts throughout and wherein:

FIGURE 1 is a perspective view, partially schematic, showing the impulse rocket of the present invention.

FIGURE 2 is a vertical sectional view, partially schematic, of the rocket of FIGURE 1 showing the parts in the position occupied at the beginning of a thrust cycle.

FIGURE 3 is a view similar to FIGURE 2 but illustrating the position of the parts at the end of a thrust cycle prior to refilling the fuel and oxidizer feed cylinders.

FIGURE 4 is a circuit diagram of the electrical control system for the rocket shown in FIGURES 1, 2 and 3.

FIGURE 5 is a somewhat diagrammatic elevational view of a space vehicle equipped with a plurality of impulse rockets driving the vehicle and controlling attitude of the vehicle.

Turning now to the drawings and in particular to FIGURE 1 thereof, there is shown an impulse rocket system suitable for attitude control applications. In practice as shown in FIGURE 5, a vehicle V, such as a satellite to be guided is normally provided with a plurality of rockets R of the type shown in FIGURE 1, each rocket affording upon command a predetermined quantum of thrust component in a given direction. Desired flexibility in control applications usually requires the use of six or eight such rockets in a vehicle to be guided.

The individual rocket shown in FIGURE 1 includes a thrust or reaction chamber 10 in which hypergolic reaction converts fuel components into high pressure gases which are in turn converted into thrust. An exhaust discharge nozzle 12 of any suitable type commonly used in rocket motors opens into the rear or bottom end of the thrust chamber 10 and radiating fins such as 13, 14 and 15 are externally attached to the thrust chamber and nozzle assembly to help dissipate heat from the reaction products. A housing 11 is adapted to be secured to or rigidly mounted on the parent vehicle to be guided. Injector piston assemblies 16 and 17 are rigidly attached to the thrust chamber 10 and are slidably mounted for reciprocating motion in the housing 11 in a manner to be described in detail in connection with FIGURES 2 and 3. Fuel components in precisely measured predetermined quantities are fed through the injector pistons upon receipt of a command signal or pulse from the local or remote guidance system and injected into the reaction chamber. Upon reaction of the fuel components in the thrust chamber 10, the entire thrust chamber assembly including the injector pistons moves upwardly in the housing 11 once for each cycle of operation. The unit is then spring returned to its initial position. Of course, a thrust is produced on the upstroke only.

The fuel or propellant tanks 18 and 19 are carried within the vehicle to be guided and may supply propellant to any number of external rocket units such as the exemplary single unit shown in FIGURE 1. Typically, the tank 18 may contain a liquid propellant and the tank 19 a liquid oxidizer. As indicated schematically in FIGURE 1, the contents of each of the tanks 18 and 19 may be maintained under a low pressure sufficient to feed them to the rocket assemblies by means of maintaining a piston or diaphragm in the end of the tanks under pressure by pressurized nitrogen or other inert gases. Of course, any other conventional pressure maintaining means could be used. The fuel components are fed through lines 20 and 21 respectively from the tanks 18 and 19 to inlet fittings 22 and 23 secured to housing 11 and leading to injectors in the housing to be described in detail below. Check valves 24 and 25 are interposed in the lines 20 and 21 respectively to permit propellant flow to the rocket but not back to the tank. In an exemplary embodiment of the device, the propellant stored in tank 18 and fed through line 20 may, for example, be mixed hydrazines blended for low temperature freezing points whereas the oxidizer stored in tank 19 may be red fuming nitric acid. It is well known in the art that hydrazine reacts hypergolically with red fuming nitric acid and provides an efficient, stable reaction over a wide pressure range. Both the oxidizer and the hydrazine blend have relatively low freezing points, the freezing point of the hydrazine blend being −85° F. and the freezing point of red fuming nitric acid being −65° F. A preferred hydrazine blend is about 70% by weight unsymmetrical dimethyl hydrazine and about 30% by weight pure hydrazine.

The propellant and oxidizer admitted to the rocket enter a cylindrical cavity within the rocket in which the injection piston is adapted to ride and which serves as a fuel measuring chamber. The outlet of this cavity is in each instance controlled by an electrically operated solenoid valve which in turn may be controlled from an electrical control unit assembly 26 which may either be integral with the rocket housing or may be a separate assembly connected thereto by a cable 27 as schematically shown in FIGURE 1. The details of the control circuitry are shown in FIGURE 4 and the control elements in the rocket are shown in greater detail in FIGURES 2 and 3.

Turning now to FIGURES 2 and 3, there is illustrated in FIGURE 2 a somewhat schematic showing generally in vertical section of an exemplary impulse rocket with the parts in the position which exists at the beginning of the thrust cycle with the propellant cavities 28 and 29 charged. FIGURE 3 is a view similar to FIGURE 2 but illustrating the position of the parts at the end of the upstroke of the thrust cycle prior to refilling the fuel and oxidizer feed cavities.

It will be noted that at the top end of the fixed housing 11 there are provided openings 30 and 31 in which are located the inlet fittings 22 and 23 respectively connecting the feed lines 20 and 21 to the injection cylinder fuel measuring cavities 28 and 29. The pressure maintained in tanks 18 and 19 and under which the propellant and oxidizer are fed through pipes 20 and 21 to cavities 28 and 29 is preferably on the order of 50 pounds per square inch. This relatively low pressure permits the tanks 18 and 19 and the associated feeding apparatus to be of light weight construction. The cylindrical cavities 28 and 29 within the housing 11 are in open communication with the feed-lines or pipes 20 and 21 up to check valves 24 and 25 and these cylindrical cavities serve the purpose of storing a precisely measured amount of propellant and oxidizer respectively for use during each cycle of operation of the rocket. If desired, the check valves may be made integral with the inlet fittings. The cavities 28 and 29 are shown as being of the same size in the illustrative embodiment utilizing hydrazine and red fuming nitric acid, but it will of course be understood that if other fuels are used the size of these cavities may be varied to insure the most efficient or the most desirable mixture of ratio of the fuel components.

Engaged in cavity 29 at the end opposite to the inlet opening 21 is the piston 32 of the injector-piston 17 which is provided with a sealing ring 33 and an axial passage 34 for ducting fuel to a normally closed fuel on-off solenoid valve 35 which is carried at the opposite end of piston 32 and which is shown in FIGURE 2 in the energized or open position. It will be noted that in the open position the plunger 36 of the solenoid is urged upwardly against the action of its biasing spring 37 by the magnetic field generated by the coil 38 of the solenoid. In this open position of the solenoid fuel is permitted to pass from cavity 29 through the axial passage 24, hence through the solenoid 35 to the outlet duct 40 in injector 17 leading to the reaction chamber 10. It will be noted that the frame of the solenoid 35 is integral with the piston 32 and injector 17 and is integrally attached to the walls of the reaction chamber 10.

A similar configuration is used with the other fuel component cavity 28 and is comprised of piston portion 41 of injector piston 16, circular gland or sealing ring 42, hollow axial passage 43, on-off solenoid valve 44 having solenoid coil 45 and plunger 46 biased by spring 47, and outlet passage 48 in injector 16.

It will be noted that the plunger 32 is biased to the position shown in FIGURE 2 by a spring 49 the upper end of which is seated in a recess 50 in housing 11 and the lower end of which seats against the shoulder formed by the junction of the piston 32 and solenoid 35. A similar spring 51 urges the piston 41 to the position shown in FIGURE 2 and is seated at its top end in recess 52 of housing 11 and at its lower end against the solenoid 44.

Any convenient mechanical stop means is provided to limit the spring driven downward or outward travel of the assembly comprising the injector pistons, the solenoid valves, and the reaction chamber. Such a mechanical stop may for example be afforded by a bridging member 53 which integrally joins the respective casings of solenoids 44 and 35 and which abuts in the fully extended position of the assembly shown in FIGURE 2 against a stop member 54 which may conveniently extend across the interior of the housing 11 from one wall to the other thereof. The bridging member 53 may conveniently have recessed therein a normally open limit switch 55 which is open in the position shown in FIGURE 2 and in all other positions until the reaction chamber assembly reaches the top of its upward stroke at which time, as shown in FIGURE 3, the tops of the injector pistons seat against the top of the cavities and the bridge member 53 seats against a depending portion 11a of the housing 11 thereby closing the limit switch 55. The bottom surface of the stop member 54 may conveniently be arcuate so as to receive and assist in stopping the top of the reaction chamber 10 which also seats against the depending edge of housing 11 at the limit of its upward travel. A slot or opening 54a may conveniently be provided in the wall of housing 11 to receive a cable or other electrical connection means. This cable which, for clarity of illustration is not shown in FIGURES 2 and 3, may pass through slot 54a and through an interior passage in bridging member 53 to supply energy to the solenoid coils and to afford circuit connections for limit switch 55.

In FIGURE 4, which is a circuit diagram of the electrical control circuit of the impulse rocket, it will be noted that the coils 38 and 45 of the normally closed spring biased solenoids 35 and 44 are connected in series with each other and with a current limiting resistance 56 across the positive and negative terminals of a battery or other source of electrical power 57 through a circuit which includes a normally open spring biased relay switch 58. Switch 58 is mechanically ganged to a second switch 59 which is also spring biased to a normally open position and both of these switches are adapted to be closed energization of a relay coil 60 upon receipt of a command pulse or signal either remotely by radio communication or directly from a local guidance system. It will be noted that the command pulse source 61 is directly connected in series with the solenoid coil 60 through a circuit including the current limiting resistor 62. When a command pulse from source 61 is applied to relay coil 60 through resistor 62 the switches 58 and 59 are both closed. Closing of switch 59 completes a holding circuit through conductor 63, resistor 62, relay coil 60, and the battery 57 which acts as a holding circuit to maintain the switches 58 and 59 in a closed position. Closing of switch 58, of course, completes the circuit from battery 57 through conductor 64, switch 58, solenoid coils 45 and 38, and resistor 56 which energizes the coils 38 and 45 and thereby opens the solenoid valves 35 and 44 to the position shown in FIGURE 2.

Thus, upon receiving an electrical signal from the guidance or control system, the simultaneous actuation to an open position of the fuel and oxidizer on-off solenoid valve takes place. This results in a synchronized introduction of both propellant constituents into the reaction chamber 10, thereby instituting hypergolic ignition of the propellant constituents in the reaction chamber. A portion of the force generated in the initial ignition acts upon the upper surface of the reaction chamber, that is upon the area of the interior surface opposite to the exhaust discharge nozzle 12 thereby creating a pressure differential between the reaction chamber 10 and the propellant cavities 28 and 29. This pressure differential causes a substantial increase in the rate of flows thereby enabling the system to attain its rated thrust increment. The thrust generated urges the reaction chamber and the integrally attached solenoid and piston assemblies upwardly against springs 49 and 51 from the position shown in FIGURE 2 to the position shown in FIGURE 3, in which these springs are compressed. During the course of this upward movement, and by virtue of the fact that check valves 24 and 25 prevent the backward flow of the propellant constituent to the tanks 18 and 19, the pistons 32 and 41 ride upwardly in cavities 28 and 29 thereby ejecting the liquid content of these cavities through the axial flow passages and into the reaction chamber so that all of the predetermined quantity of fuel constituents contained in the cavities will in fact be injected into the reaction chamber and will be used to produce a quantized or predetermined unitary amount of thrust.

When the upward travel of the reaction chamber assembly has been completed, the bridging member 53 rests against the portion 11a of the housing 11 and the normally open limit switch 55 is closed. It will be noted from FIGURE 4 that limit switch 55 is connected in series with a small current limiting resistor 65 across the terminals of battery 57. It will further be noted that the series circuit including the limit switch 55 is in shunt or parallel relation with the other two series circuits connected across the battery 57, that is, with the holding circuit including switch 59 and with the solenoid valve circuit including switch 58. Each of these three series circuits which are in parallel with each other includes a current limiting resistor namely, the resistors 56, 62, and 65 respectively. The values of these resistors may readily be selected so that upon closing of the limit switch 55 the other two circuits are effectively short circuited across the battery 57 permitting switches 58 and 59 to return to their normally open position and thereby closing the solenoid valves 35 and 44 through de-energization of solenoid coils 38 and 45. Alternatively, of course, the same result could be achieved by placing a normally closed limit switch in series between resistor 62 and coil 60 thereby eliminating the shunt shorting circuit. Opening of such a switch at the end of the piston's travel would break the holding circuit and positively prevent actuation by a command pulse at this time.

With cessation of the forces acting within reaction chamber 10 by virtue of expanding gases, the chamber return springs 49 and 51 which were compressed during the thrust cycle act upon and return the reaction chamber to its original position shown in FIGURE 2 while at the same time permitting a refilling of the propellant cavities. That is to say, the reaction chamber is urged downwardly to limit of its travel defined by the stop member 54 and the bridging member 53. As soon as the downward movement begins, the limit switch 55 reopens. However, the holding circuit including switch 59 is then also open and the electrical control system will therefore remain quiescent permitting the solenoid valves to remain closed until another command pulse is received to initiate another cycle of operation. It should be noted that switch 58 could be eliminated by connecting solenoid 45 directly to the arm of switch 59. If this is done, however, the solenoid valve circuit including coils 38 and 45 is placed in parallel with solenoid 60 across the command pulse source thereby imparting an additional requirement on its output. Whether this is desirable or not of course depends upon the pulse source available in any particular application.

In the above described mode of operation, it is thus apparent that a single command pulse will produce a single cycle of operation which in turn will produce a predetermined increment of thrust along the thrust axis or discharge direction of the rocket. Such a mode of operation is adapted for directly executing commands transmitted in digital form where each pulse represents one increment of desired thrust. If desired, however, an additional limit switch may be recessed in the stop member 54 and connected in the electrical control system in such a fashion that if a continuing signal is still being supplied from the guidance or control system when this switch is closed by bridging member 53 the rocket motor will keep on repeating its cycle of thrust and return until the demand for attitude control has been satisfied as indicated by absence of the signal from the guidance system.

Such a switch would simply be a normally open relay in series between pulse source 61 and solenoid coil 60 assuring the pulse source to be a continuously operating generator. When the guidance system signal is removed, the thrust or impulse producing rocket will then remain in its return position until receipt of another electrical signal. Such an arrangement is more particularly suited to operation with essentially analog guidance or control systems in which magnitudes are represented by the duration of an electrical signal. A similar repetitive mode of operation can also be achieved by providing in the command pulse source 61 shown in FIGURE 4 a pulse generator which continuously emits pulses under the control of a continuing signal until the attitude of the vehicle has been adjusted to that called for by the guidance system at which time the guidance signal shuts off the pulse generator. This arrangement has the advantage shared by the rest of the circuitry shown in FIGURE 4 that no power is consumed during standby intervals when the rocket motor is not being actuated.

While electromechanical control circuitry has been shown by way of example in FIGURE 4, it will of course be apparent to those skilled in the art that equivalent electronic logic or control circuitry could readily be used if desired.

In one particular exemplary embodiment of the invention an impulse rocket constructed in accordance with the teachings herein will produce 0.5 pound-seconds of impulse per cycle. The period of each cycle may for example be approximately 70 milliseconds and the propellant consumption in such a rocket equals only 0.002 pounds per cycle. Typically, the over-all length of the device from the inlet fittings 22 and 23 to the tip of the discharge nozzle 12 may be approximately 5½ inches, the throat area 0.0123 square inches, the diameter 1.5 inches, the nozzle area ratio 30, and the weight of the single rocket assembly less than the 1 and ¾ pounds.

For the purposes of this application, a space vehicle is an artificial body operating essentially or exclusively outside the earth's atmosphere.

While a particular exemplary embodiment of the invention has now been described in detail above, it will be apparent to those skilled in the art that modifications and variations therein may be effected without departing from the spirit and scope of the novel concepts of the present invention as defined by the following claims.

I claim as my invention:

1. A rocket for producing a predetermined quantum of impulse in response to a control signal comprising, thrust producing means connected to discharge gases generated by hypergolic reaction of first and second fuel components in a reaction chamber, first and second injector pistons rigidly attached to said reaction chamber, a housing having first and second fuel measuring cavities therein, said injector pistons being respectively mounted for reciprocating motion in said cavities, stop means on said housing, spring biasing means urging said injector pistons outwardly from said cavities to said stop means, a check valve controlled fuel component feed inlet to each of said cavities, an axial passage in each of said injector pistons, said passage opening at one end into the cavity associated with said piston and opening at the other end into said reaction chamber, a solenoid controlled valve in each of said passages biased to a normally closed position, signal responsive means to energize said valves to open each of said outlet passages to flow of fuel from one of said cavities to said reaction chamber, and limit switch means actuated by movement of said injector pistons completely into said cavities in response to thrust produced by said gases of said hypergolic reaction to de-energize and thereby reclose said solenoid valves in said passages.

2. A rocket for producing a predetermined quantum of impulse comprising, means to discharge gases generated from combustion of a fuel and oxidizer in a reaction chamber to produce impulse, piston injection means to inject only a fixed total quantity of fuel into said reaction chamber during each stroke of said piston, solenoid valve control means responsive to an applied electrical control signal to initiate flow of said fuel and oxidizer to said reaction chamber, and limit switch control means connected in circuit with said solenoid valve to be responsive to completion of the stroke of said piston to close said valve and terminate said flow of fuel and oxidizer to said chamber to thereby normally stop the operation of said rocket after production of a single quantum of thrust the magnitude of which is determined by the amount of fuel and oxidizer injected during one stroke of said piston.

3. A rocket engine for producing upon command a predetermined quantity of thrust for each single cycle of operation which comprises a support, a casing reciprocally mounted on said support and defining a reaction chamber and a discharge nozzle for said chamber, said support having a separate fuel chamber and oxidizer chamber, fuel and oxidizer supply means for said fuel and oxidizer chambers, pistons on said casing slidable in said fuel and oxidizer chambers, springs urging the support and casing away from each other to move the pistons outwardly from said fuel and oxidizer chambers for accommodating filling of the chambers from said supply means, check valves between the fuel and oxidizer chambers and the supply means to stop flow back to the supply means, remote control valves between said fuel and oxidizer chambers and said reaction chamber, command means for opening said remote control valves whereby fuel and oxidizer will flow from said fuel and oxidizer chambers to said reaction chamber for forming gases which will discharge through the nozzle to develop thrust reacting against the springs to move the casing toward the support and simultaneously force the pistons into the fuel and oxidizer chambers to inject the fuel and oxidizer therefrom into the reaction chamber while loading the springs for subsequent retraction upon cessation of the thrust to thereby effect refilling of the chambers for the next cycle of operation, and means for closing said remote control valves when said pistons are substantially retracted into the fuel and oxidizer chambers to prevent repetition of the operating cycle until the command means is again energized.

4. A rocket engine for producing upon command a predetermined quantity of thrust for each single cycle of operation which comprises a fixed support, a casing slidably carried by said support and having a chamber and a discharge nozzle to develop a flow of thrust gases in a direction that will cause a reaction to move the casing toward the support, spring means urging the casing away from the support, said support having a fuel measuring cavity, said casing carrying an injector piston in said cavity, means for supplying fuel to said cavity, a remote control valve between said cavity and said chamber, command means for opening said valve to flow fuel from the cavity to said chamber and develop thrust gases which will create a reaction moving the casing toward the support to retract the piston into the cavity and exhaust the fuel therefrom while simultaneously loading the spring for separating the casing and support upon cessation of the thrust to move the piston out of the cavity for refilling the cavity, and means for automatically closing the remote control valve when the piston is substantially retracted into the cavity to prevent an unauthorized repeated cycle of operation.

5. A rocket engine adapted for controlled cyclic operation to produce upon command a predetermined quantity of thrust for each operating cycle which comprises a fixed support, a rocket unit slidable by recoil in said fixed support whenever the unit is discharging thrust gases, fuel and oxidizer metering cavities in said support, piston means on said rocket unit slidable in each of said cavities and effective to discharge fuel and oxidizer therefrom into the rocket unit, spring means moving the piston means outwardly from the cavities to accommodate filling of the cavities with fuel and oxidizer, remote control valves controlling flow from the cavities to the rocket unit, means for closing said remote control valves whenever the pistons are substantially fully retracted into the cavities, and command means to open said remote control valves whereby fuel and oxidizer will flow from the cavities to the rocket unit to react therein and develop thrust gases causing the unit to recoil and move the pistons into the cavities for discharging a charge of fuel and oxidizer therefrom, and said spring means being loaded by the recoil movement for moving the pistons outwardly of the cavities for accommodating refilling of the cavities for the next cycle of operation.

References Cited in the file of this patent
UNITED STATES PATENTS

| | | |
|---|---|---|
| 2,395,435 | Thompson et al. | Feb. 26, 1946 |
| 2,536,597 | Goddard | Jan. 2, 1951 |
| 2,647,364 | Dreibelbis | Aug. 4, 1953 |
| 2,649,335 | Funke | Aug. 18, 1953 |
| 2,771,739 | Malina | Nov. 27, 1956 |